US007688830B2

(12) United States Patent
Lee et al.

(10) Patent No.: US 7,688,830 B2
(45) Date of Patent: Mar. 30, 2010

(54) METHOD AND APPARATUS OF FULLY DISTRIBUTED PACKET SCHEDULING FOR A WIRELESS NETWORK

(75) Inventors: Yao-Nan Lee, Kaohsiung (TW); Jiunn-Tsair Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 543 days.

(21) Appl. No.: 11/559,408

(22) Filed: Nov. 14, 2006

(65) Prior Publication Data
US 2008/0019374 A1  Jan. 24, 2008

(30) Foreign Application Priority Data
Jul. 18, 2006   (TW) ............................... 95126189 A

(51) Int. Cl.
   *H04L 12/28* (2006.01)
(52) U.S. Cl. .................... 370/395.4; 370/329; 370/335; 370/342; 714/752; 714/755; 714/780
(58) Field of Classification Search .................. 370/347, 370/348, 400, 416, 386, 395.4; 714/801, 714/752, 755, 780
   See application file for complete search history.

(56) References Cited

U.S. PATENT DOCUMENTS

| 2006/0153179 | A1* | 7/2006 | Ho et al. | 370/386 |
| 2006/0239288 | A1* | 10/2006 | Posey, Jr. | 370/416 |
| 2007/0217432 | A1* | 9/2007 | Molisch et al. | 370/400 |

FOREIGN PATENT DOCUMENTS

| TW | 326117 | 2/1998 |
| TW | 569571 | 1/2004 |
| TW | 576045 | 2/2004 |
| TW | I223944 | 11/2004 |
| TW | I246283 | 12/2005 |
| TW | 200618488 | 6/2006 |

OTHER PUBLICATIONS

Author: Jung-Chie Chen, Pangan Ting, Chih-Lin, Jiunn-Tsiair Chen, Titlle: A Novel Broadcast Scheduling Strategy Using Factor Graph and Sum-Product Algorithm Publisher: IEEE Data: Jan. 17, 2005 vol. 6 pp. 4048-4053.*

Lin. Y-D; Hsu, Y-C, "Multihop cellular: a new architecture for wireless communications," in Proc. IEEE INFOCOM, vol. 3, pp. 1273-1282, Tel-Aviv, Israel, Apr. 2000.

(Continued)

*Primary Examiner*—Pankaj Kumar
*Assistant Examiner*—Anez Ebrahim

(57) ABSTRACT

Disclosed is a method and apparatus for fully-distributed packet scheduling in a wireless network. The decoding algorithm with low-density parity-check code is applied in a transmission wireless network to achieve the fully-distributed packet scheduling. In the packet scheduling, only one wireless network node is needed to exchange information and communicate with its neighboring network nodes. Therefore, it is not necessary to estimate the signal to noise ratio, while being eye to eye among the neighboring network nodes. If the network load exceeds the network capacity, the present invention automatically eliminates the most difficult user to reduce the overall network load and diverts the resources to the surviving users.

16 Claims, 10 Drawing Sheets

OTHER PUBLICATIONS

Viswanathan, H. and et al, "Relay-based deployment concepts for wireless and mobile broadband radio," in IEEE Communications Magazine, pp. 80-89, Sep. 2004.

Raffaele Bruno; Marco Conti; Enrico Gregori, "Mesh networks: commodity multihop and hoc networks," in IEEE Communications Magazine, pp. 123-131, Mar. 2005.

Gastpar, M.; Vetterli, M, "On the capacity of wireless networks: The relay case," in Proc. IEEEINFOCOM, vol. 3, New York, NY, pp. 1577-1586, Jun. 2002.

Viswanathan, H.; Mukherjee, S., "Performance of cellular networks with relays and centralized scheduling," Vehicular Technology Conference, vol. 3, pp. 1923-1928, Oct. 2003.

Viswanathan, H.; Mukherjee, S., "Performance of cellular networks with relays and centralized scheduling," journal version, pre-pring.

Kschischang, F. R.; Frey, B. J.; Loeliger, H-A., "Factor graphs and the sum-product algorithm," IEEE Transactions on Information Theory, vol. 47, pp. 498-519, Feb. 2001.

Ephremides, A.; Truong, T. V., "Scheduling broadcast in multihop radio networks," IEEE Transactions on communications, vol. 38, pp. 456-460, Feb. 1990.

Chen, Jung-Chieh; Wang, Yeong-Cheng; Chen, Jiunn-Tsair, "A novel broadcast scheduling strategy using factor graphs and the sum-product algorithm," Accepted for Publication in IEEE Trans. On Wireless Communications.

Raman, B.; Chebrolu, K.,"Revisiting MAC Design for an 802.11-based Mesh Network," Third Workshop on Hot Topics in Networks (HotNets-III), San Diego, CA, USA, pp. 15-16, Nov. 2004.

Maniezzo, D.; Villa, G.; Gerla, M. "A smart MAC-Routing protocol for WLAN mesh network" UCLA-CSD Technical Report No. 040032, Oct. 2004.

"Overcoming Interference in the Unlicensed Wireless Spectrum" White paper, SkyPilot Networks, Inc, available at www.skypilot.com/pdf/Interference.pdf.

* cited by examiner

METHOD AND APPARATUS OF FULLY DISTRIBUTED PACKET SCHEDULING FOR A WIRELESS NETWORK

FIELD OF THE INVENTION

The present invention relates to a method and apparatus of fully distributed packet scheduling for a wireless network.

BACKGROUND OF THE INVENTION

The packet scheduling algorithm in a wireless multihop network is usually central-unit processing-based. This type of algorithm, although effective, is costly in terms of computing complexity and not scalable with the network size and the traffic demand. This type of algorithm requires sending every possible combination of transmission and receiving and the corresponding signal-to-noise-ratio (SNR) to the base station (BS), and uses a brutal force method to find the optimal combination. In an actual system, it is difficult to estimate the SNR, not to mention the SNR for all the combinations. Besides, the SNR estimation is only the beginning. The real computation is in the central-unit processing-based packet scheduling.

In a multi-hop wireless network, a relay is for storing and forwarding the packets received at BS to the network node of the mobile station (MS), and vice versa. In other words, the MS in a multi-hop wireless network can also transmit packets from a BS to a relay, and packets from a relay to an MS.

A relay network is a network that has relays between the BS and the MS. There are several advantages of a relay network. The distance of the transmit-receive pair is shorter, and the required transmission power can be reduced in order to expand the service coverage area. The network throughput is therefore increased because the BS, MS, and relay are allowed to transmit packets simultaneously. The channel reuse is also possible by spatial multiplexing technique.

FIG. 1A shows a schematic view of a conventional single cell multihop wireless network. The wireless network includes a base station BS, two relays R1, R2, and four users (mobile station) M1-M4. FIG. 1B shows a schematic view of a conventional multiple-cells multi-hop wireless network. The wireless network includes three base stations BS1-BS3, four relays R1-R4, and eight users M1-M8. In FIGS. 1A & 1B, the variable $v_j$ on each network link indicates whether the network link is currently transmitting.

However, if the packets for transmission are not appropriately scheduled, each advantage of using a relay is also accompanied by side effects. For example, when the service coverage area is expanded, the packets from MS are moving among several relays before they reach their destination. Therefore, if the relays do not schedule the packet transmission carefully, the wireless network resources may be wasted. On the other hand, as the simultaneous packet transmission is allowed in a multihop wireless network, the frequent data packet collision may occur. In this case, the performance will greatly decrease.

A good packet scheduling technique not only requires the avoidance of packet collision, but also exploits the spatial reuse characteristics of the multihop wireless network in order to maximize the system throughput. As shown in FIG. 1A, if the outcome of the packet scheduling algorithm is $\{v_1, v_2, v_3, \ldots, v_{10}\} = \{0,1,0,0,1,0,0,0,0,1\}$, instead of $\{0,1,0,0,0,0,0,0,0,0\}$, where $v_j=1$ indicates the network link is currently transmitting, and $v_j=0$ indicates that the network link is not transmitting, the network overall performance is better. This is because the first schedule includes three network links transmitting, while the second schedule only has one link transmitting. It is also worth noticing that the schedule $\{0,1,0,0,0,0,0,1,1,0\}$ is not an effective schedule as the three packets transmitting to the user M3 will collide.

SUMMARY OF THE INVENTION

The present invention provides a method and apparatus of fully-distributed packet scheduling for a wireless network to effectively solve the side effects associated with conventional packet scheduling algorithms in a multi-hop wireless network.

The present invention is based on the factor graph and a sum-product algorithm to apply a low-density parity-check (LDPC) code decoding algorithm to a multihop wireless network to achieve the packet scheduling. The factor graph is a schematic view of the multi-hop wireless network, and the neighboring base stations and mobile users use the sum-product algorithm for communication.

Accordingly, the packet scheduling method of the present invention includes the following three steps: (a) constructing a factor graph to model a multi-hop wireless network; (b) based on the factor graph, transforming the packet scheduling problem into a LDPC code decoding problem and using a standard process to solve the decoding problem; and (c) weighting the packet schedule in accordance with the network condition.

The fully-distributed packet scheduling apparatus of the present invention includes a network modeling unit, a packet scheduling unit and a weighting scheme to realize the fully distributed packet scheduling method.

The foregoing and other features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 1A:
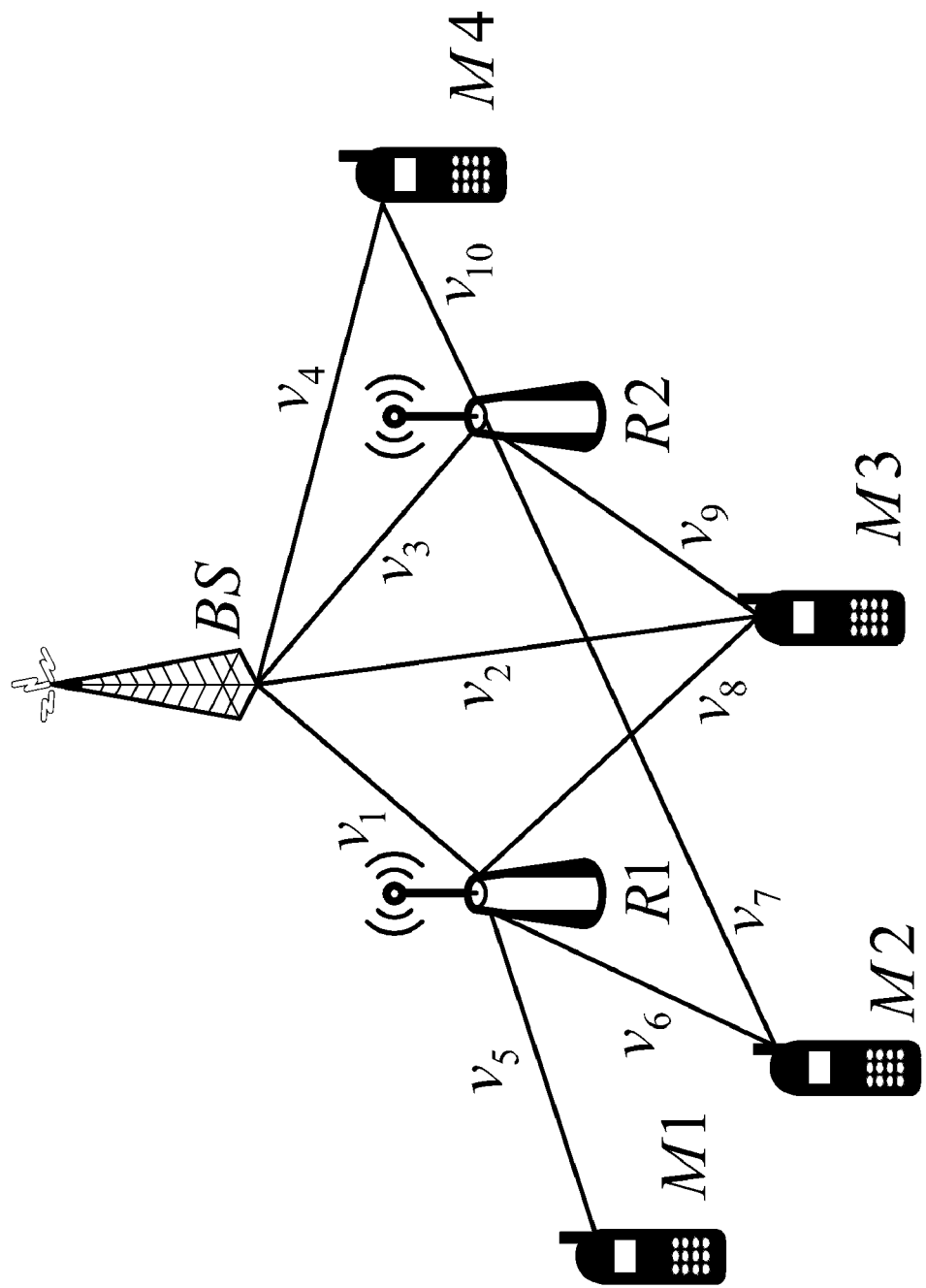
FIG. 1A shows a schematic view of a conventional single cell multihop wireless network.

In FIG. 1A, it can be observed that the packet scheduling problem can be transformed into a decoding problem for low-density parity-check (LDPC) code as long as the packet scheduling problem can be described by a factor graph model, and the constrain rules are defined for the variable vj on each network link. A standard process commonly known as sum-product algorithm can solve the decoding problem for LDPC code. To fully explore the network resources, the present invention designs a weighting scheme so that the user with more packets has a higher priority for transmission.

Figure 2:
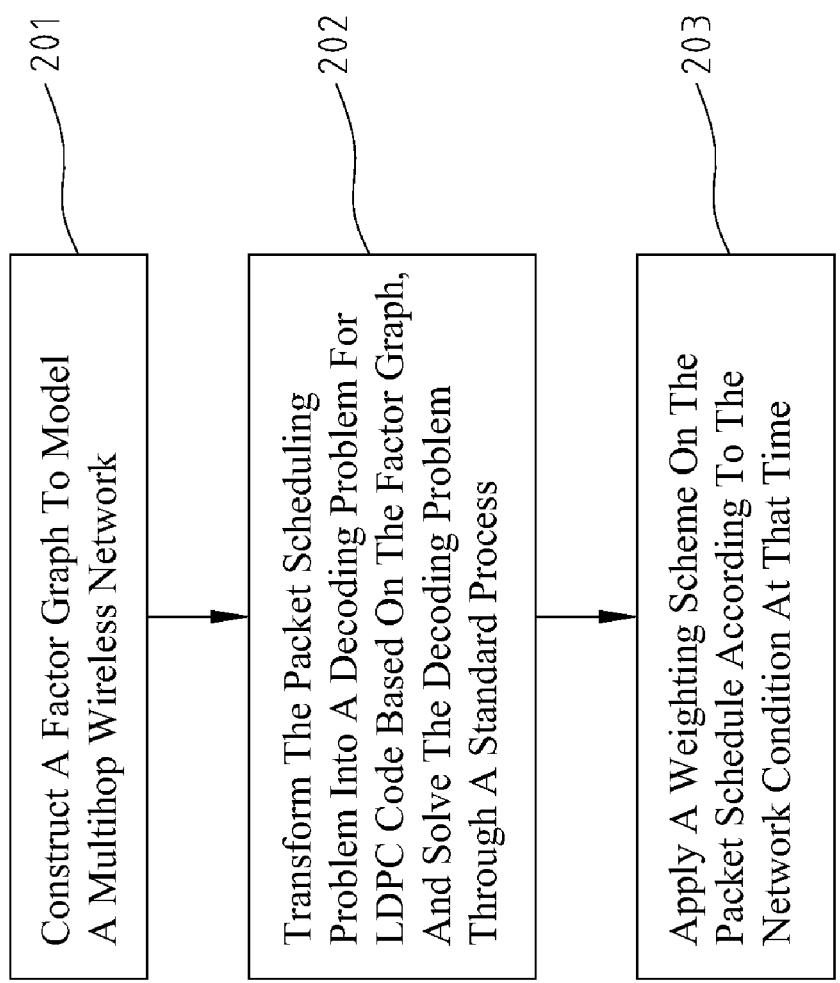
FIG. 2 shows a flowchart of the full-distributed packet scheduling method of the present invention in a relay network.

FIG. 2 shows a flowchart of the fully-distributed packet scheduling method of the present invention. First, step 201 is to construct a factor graph to model a multi-hop wireless network. The factor graph includes a plurality of agent nodes, a plurality of variable nodes and a plurality of edges. The factor graph is a mutually-interactive graph. Step 202 is to transform the packet scheduling problem into a decoding problem for LDPC code based on the factor graph, and use a standard process to solve the decoding problem. In other words, the sum-product algorithm is used as a tool for an access point (AP) to communicate with the neighboring APs. Step 203 is to apply a weighting scheme on the packet schedule according to the network condition at that time.

The construction of factor graph in step 201 can be implemented with the following three steps.

(a) An agent node is used to represent each network node. Each agent node is marked with the corresponding constrain function $f_i$, which defines an interference-avoiding local constrain rule.

(b) A variable node is used to represent a network link. Each variable node is marked with a variable $v_j$.

(c) Each variable node is linked to two agent nodes, where the network nodes corresponding to the two agent nodes can communicate through the network link corresponding to the variable node.

To improve the utilization of the network resource, the present invention uses the link communication to repeatedly exchange the soft-information of the probability mass function (pmf) of each variable node between the neighboring network nodes and variable nodes.

Figure 1B:
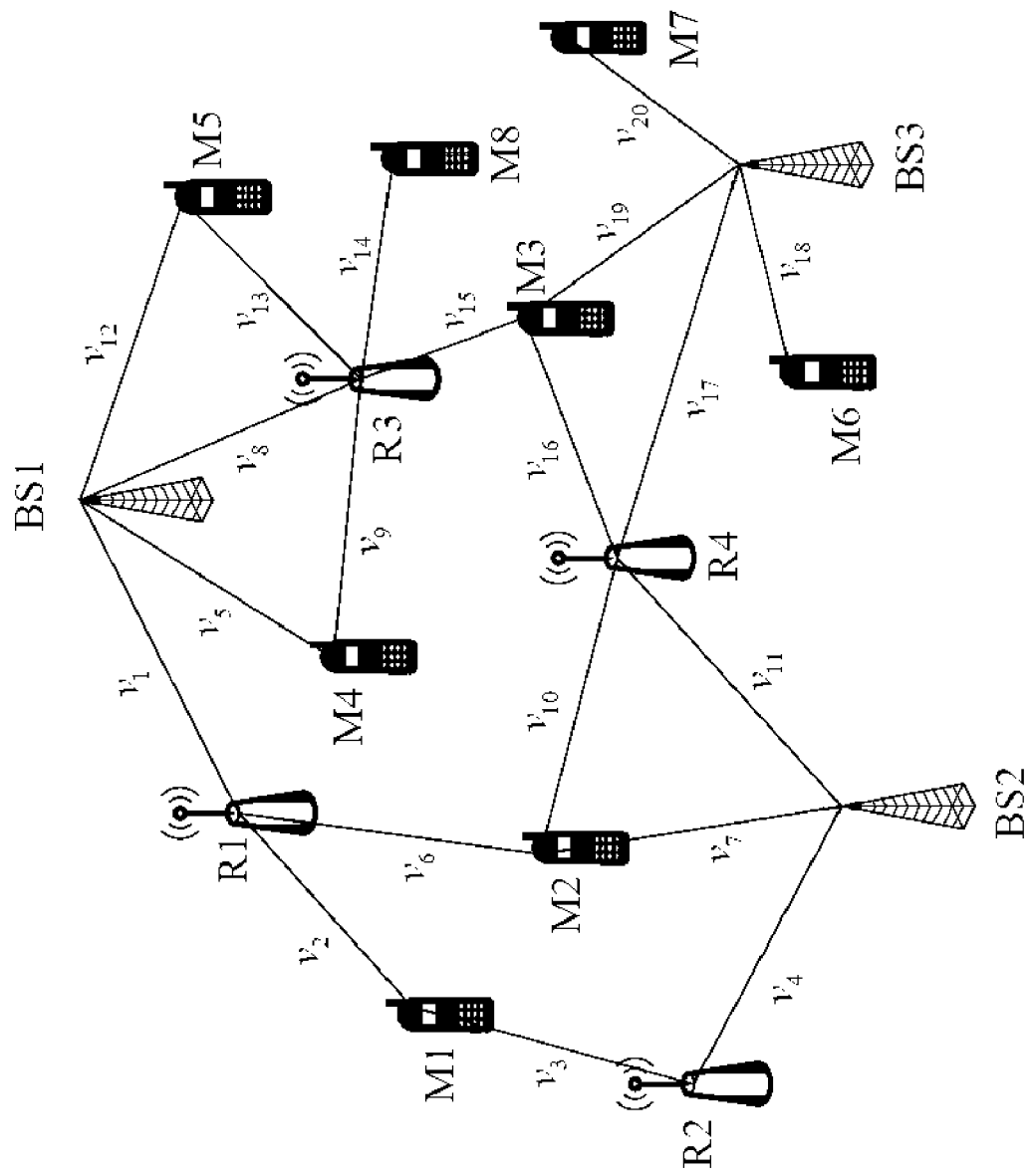
FIG. 1B shows a schematic view of a conventional multi-cell multihop wireless network.
Figure 3A:
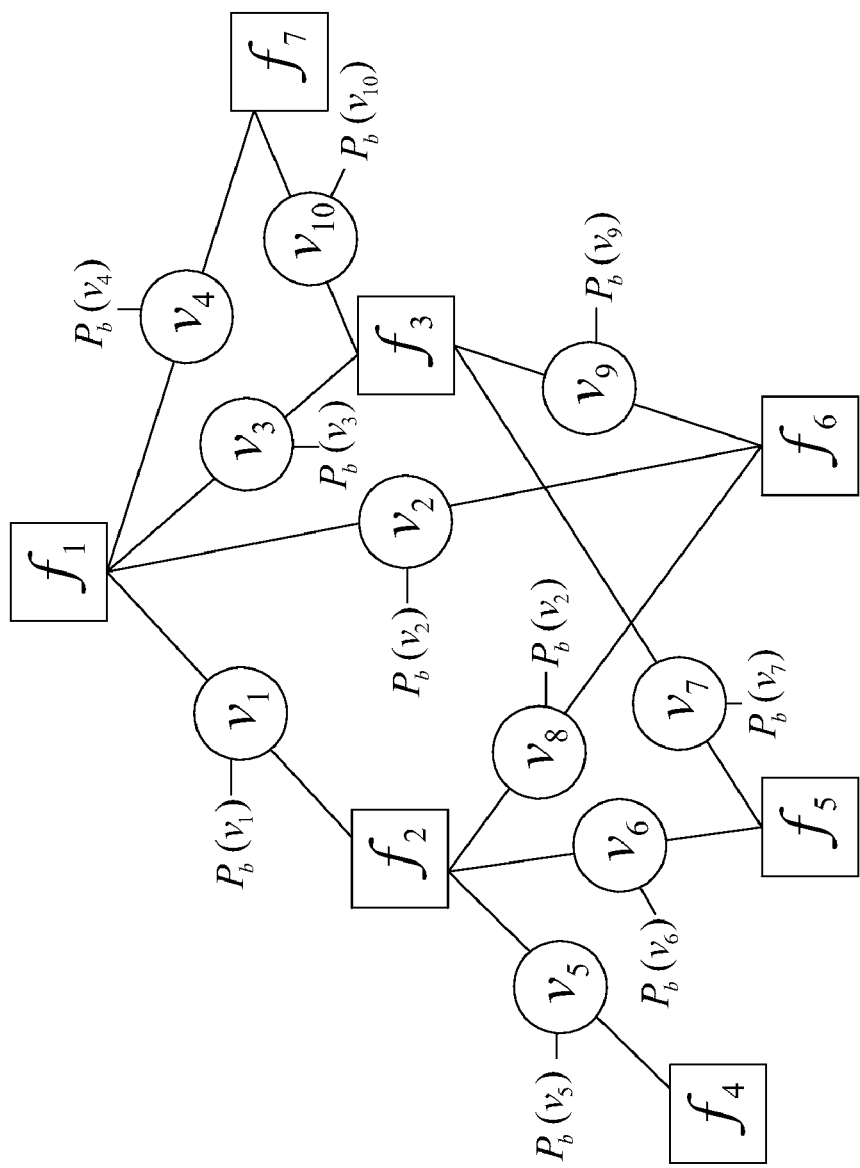
FIG. 3A shows a factor graph of FIG. 1A.
Figure 3B:
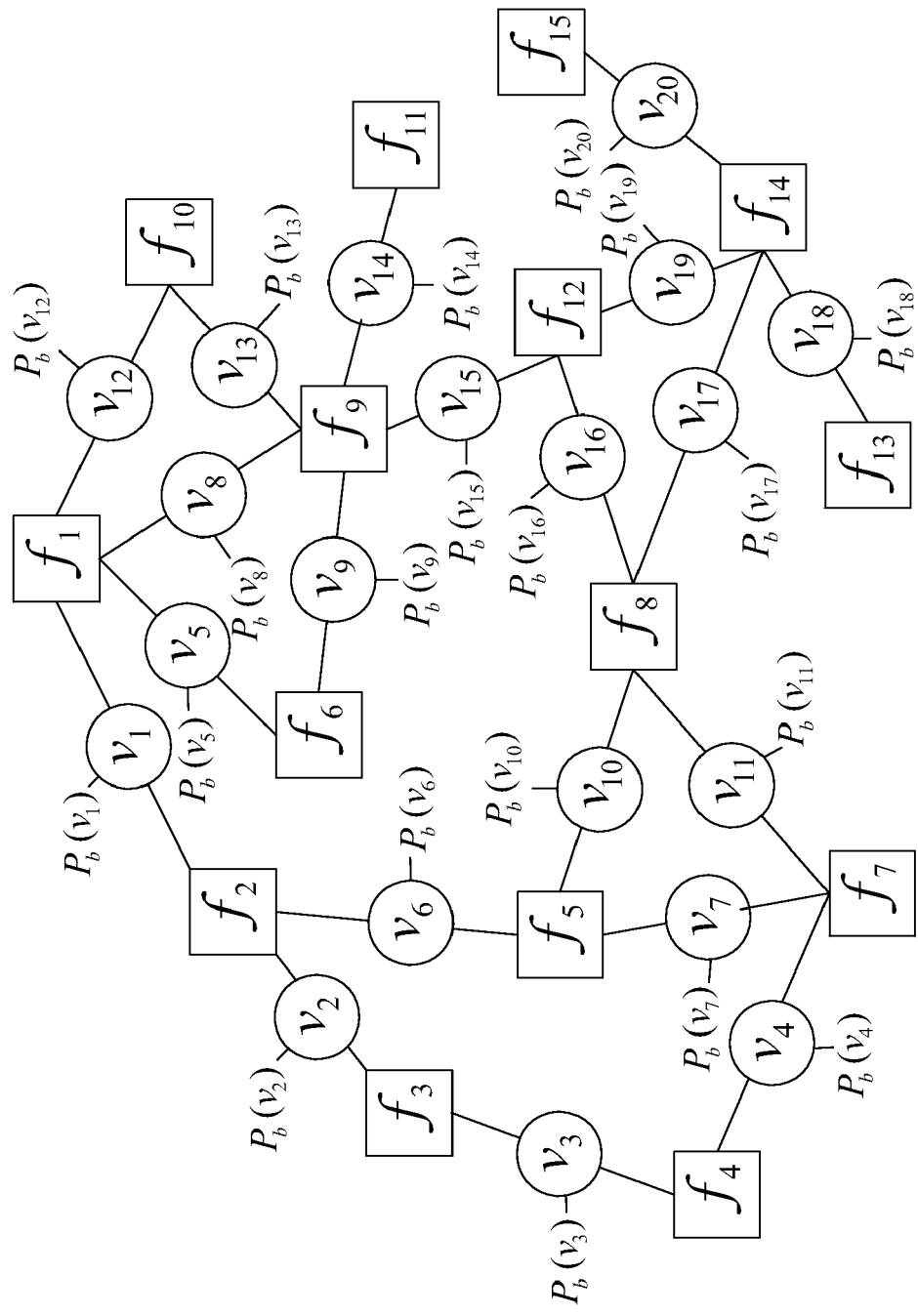
FIG. 3B shows a factor graph of FIG. 1B.

Taking FIG. 1A as an example, FIG. 3A shows a factor graph of a single cell network constructed by using the above three steps. Taking FIG. 1B as an example, FIG. 3B shows a factor graph of a multi-cell network constructed by using the above three steps.

To meet the basic multi-hop wireless network and the interference-avoiding local constrain rules, each network node must obey the following rules during each packet slot.

(a) A network node can only transmit to one network node during transmission.

(b) A relay cannot transmit and receive packets simultaneously.

(c) A network node cannot receive packets from multiple sources simultaneously.

In other words, when executing the interference-avoiding local constrain rule and sum-product convergence, each agent node in the example in FIG. 3A must obey the following constrain rules:

$f_1$: $v_1 + v_2 + v_3 + v_4 \leq 1$; and $f_2$: $v_1 + v_5 + v_6 + v_8 \leq 1$; $f_3$: $v_3 + v_7 + v_9 + v_{10} \leq 1$; and $f_4$: $v_5 \leq 1$; $f_5$: $v_6 + v_7 = 1$; and $f_6$: $v_2 + v_8 + v_9 \leq 1$; $f_7$: $v_4 + v_{10} \leq 1$.

That is, the variables surrounding each agent node form a valid local transmission pattern. In the example in FIG. 3A, the valid local transmission pattern is: for BS, $\{v_1, v_2, v_3, v_4\} = \{(0,0,0,0), (1,0,0,0), (0,1,0,0), (0,0,1,0), (0,0,0,1)\}$; and for M3, $\{v_2, v_8, v_9\} = \{(0,0,0), (1,0,0), (0,1,0), (0,0,1)\}$, and so on. The collection of all the valid local transmission patterns forms a valid global collision-free schedule.

It is worth noticing that the interference-avoiding local constrain rules can be applied to both single cell and multi-cell multihop wireless network.

The following describes how to compute and transport the soft-information that can improve the network resource utilization. The soft-information shows the probability that each network link will be utilized in each packet slot.

First, the probability $P_b(v_j)$ of each variable node $v_j$ ($v_j = b$, b is 0 or 1) is initialized. Then, the soft-information $SI_{st}(x, y, b)$ of each agent node (marked by the corresponding constrain function $f_i$) linking to each variable node $v_j$, where $P_1(v_j)$ is uniformly distributed between $(0,1)$, and $P_0(v_j) + P_1(v_j) = 1$. $SI_{st}(x, y, b)$ represents the soft-information transported from node x to node y, and indicates the probability when the corresponding variable node $v_j$ is b. The subscript s is the packet slot index, t is the iteration index. The initialized probability $P_b(v_j)$ is the probability randomly assigned to each variable node $v_j$.

It is worth noticing that the initialized $P_b(v_j)$ can be added through the network link corresponding to the variable node $v_j$ to one of the two agent nodes linking the variable node.

Then, according to the standard sum-product algorithm, the soft-information $SI_{st}(x, y, b)$ transported from variable node $v_j$ to agent node (mark by the corresponding constrain function $f_i$) can be computed. Taking variable node $v_1$ and agent node $f_2$ as an example, the soft-information is computed as $SI_{st}(v_1, f_2, b) = c_{1,2} P_b(v_1) \cdot SI_{(s-1)t}(f_1, v_1, b)$, where $c_{1,2}$ is a normalizing factor to make $SI_{st}(v_1, f_2, 0) + SI_{st}(v_1, f_2, 1) = 1$.

Furthermore, in addition to weighting each valid local transmission pattern, the same sum-product algorithm is used to compute the soft-information transported from agent node (mark by the corresponding constrain function $f_i$) to variable node $v_j$. The agent node (mark by the corresponding constrain function $f_i$) collects all the incoming soft-information from its neighboring variable nodes $\{V_n\}$, and computes the soft-information $SI_{st}(f_i, v_j, b)$ to be transported to variable node $v_j$. Taking BS as an example, the soft-information is computed as $SI_{st}(f_1, v_1, 1) = d_{1,1} \{\omega_t(f_1, 1000)) \cdot SI_{st}(v_2, f_1, 0) SI_{st}(v_3, f_1, 0) SI_{st}(v_4, f_1, 0)\}$, where $d_{1,1}$ is a normalizing factor.

The total soft-information $SI_{st}(v_j, b)$ of variable node $v_j$ can be computed as the product of all the soft-information $SI_{st}(f_i, v_j, b)$, where $f_i$ belongs to the set of all the agent nodes linking to variable node $v_j$.

It is worth noticing that the above soft-information computation of variable node $v_j$ can be applied to both single cell and multi-cell multihop wireless network. After the second iteration, if $SI_{st}(v_j, 1) \geq SI_{st}(v_j, 0)$, variable node $v_j$ is determined to be active; that is $v_j = 1$; otherwise, $v_j = 0$. When all the variable nodes $v_j$ follow the interference-avoiding local constrain rule, the standard sum-product algorithm terminates and outputs a valid global schedule. Otherwise, the agent nodes not following the interference-avoiding local constrain rule must repeat the above sum-product computation.

A multihop wireless network may prefer a certain interference-avoiding or collision-free packet scheduling method to others because the former can maximize the reuse of the network resources. For example, in a single cell multihop wireless network, the service provider can prefer the global schedule $\{v_j\}=\{0,1,0,0,1,0,0,0,0,1\}$, instead of the global schedule $\{v_j\}=\{0,1,0,0,0,0,0,0,0,0\}$ because the former can reuse the network resource more effectively, even though both are valid interference-avoiding or collision-free scheduling techniques.

Therefore, to improve the network resource utilization, the present invention based on the network condition at the time, such as urgency and transmission rate of each network link, weights each valid local transmission pattern. Without the loss of generality, the present invention uses a single cell multihop wireless network as an embodiment for explanation. However, the weighting scheme is also applicable to a multi-cell multi-hop wireless network.

For agent node $f_i$, the information on the packet queue length of the neighboring agent nodes are collected, and the weight of local transmission pattern of the k-th local link of each agent node $f_i$ is computed as follows:

$$\omega t(f_i, \{0, \ldots, 0, 1, 0, \ldots, 0\}) =$$
$$\text{sum of } \{\max(x_{T,t}(k) - x_{R,t}(k), 0) / \max(x_{T,t}(h) - x_{R,t}(h), \varepsilon)\},$$

where max is the maximum function, $\varepsilon$ is a positive number, h is not equal to k, $f_h$ belongs to the set of all the variable nodes linking to the agent node $f_i$, and $x_{T,t}(k)$ and $x_{R,t}(k)$ are the total number of packets that can reach the destination queue through the k-th local link of agent node $f_i$, where subscripts T and R are the transmitting end and the receiving end of the local link, and t is the concerned packet slot index.

Figure 4A:
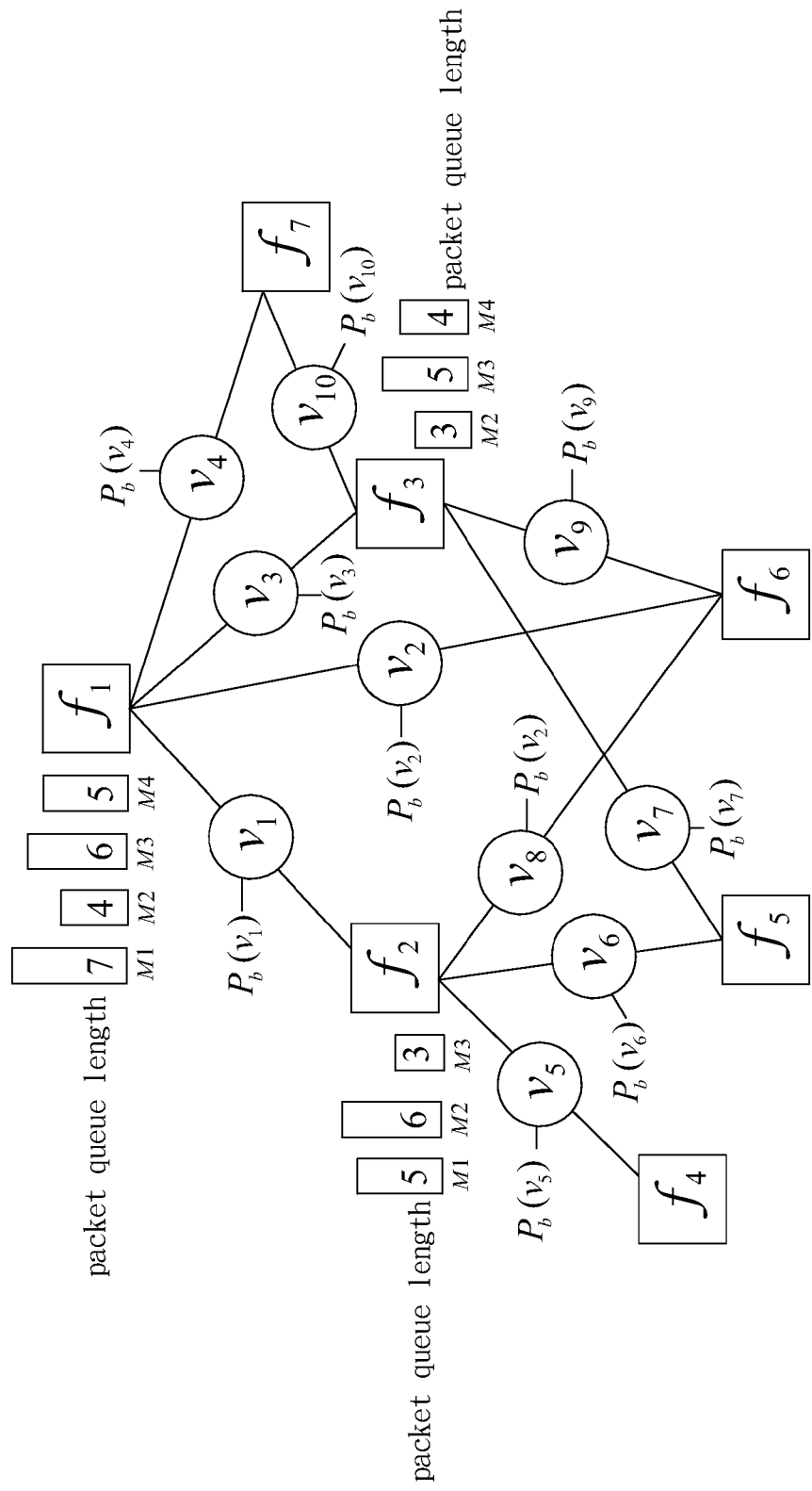
FIG. 4A shows the factor graph of FIG. 3A with information on the packet queue length of each network link, using downlink for communication.

FIG. 4A is the factor graph of FIG. 3A with information on the packet queue length of each network link, using downlink for communication. The weight of local transmission pattern $\{v_1, v_2, v_3, v_4\}$ of BS (agent node $f_1$) is computed as follows:

$$\omega_t(f_1, \{1, 0, 0, 0\}) = (7 + 4 + 6 - (5 + 6 + 3))/6 +$$
$$(7 + 4 + 6 - (5 + 6 + 3))/(4 + 6 + 5 - (3 + 5 + 4)) +$$
$$(7 + 4 + 6 - (5 + 6 + 3))/5 = 3/6 + 3/3 + 3/5 = 2.6;$$
$$\omega_t(f_1, \{0, 1, 0, 0\}) = 6/(17 - 14) + 6/(15 - 12) + 6/5 = 5.2;$$
$$\omega_t(f_1, \{0, 0, 1, 0\}) =$$
$$(15 - 12)/(17 - 14) + (15 - 12)/6 + (15 - 12)/5 = 2.1;$$
$$\omega_t(f_1, \{0, 0, 0, 1\}) = 5/(17 - 14) + 5/6 + 5/(15 - 12) = 2.1.$$

The weighting of relay is the same as the weighting of BS, except that the weight of the link that is in use and is the only link to the BS is set to be 1. Therefore, the weight of local transmission pattern $\{v_1, v_5, v_6, v_8\}$ corresponding to agent node $f_2$ is computed as follows: $\omega_t(f_2, \{1,0,0,0\})=1$; $\omega_t(f_2, \{0,1,0,0\})=5/6+5/3=2.5$; $\omega_t(f_2, \{0,0,1,0\}) =5/5+5/3=3.2$; and $\omega_2(f_2, \{0,0,0,1\})=3/5+3/6=1.1$.

Figure 4B:
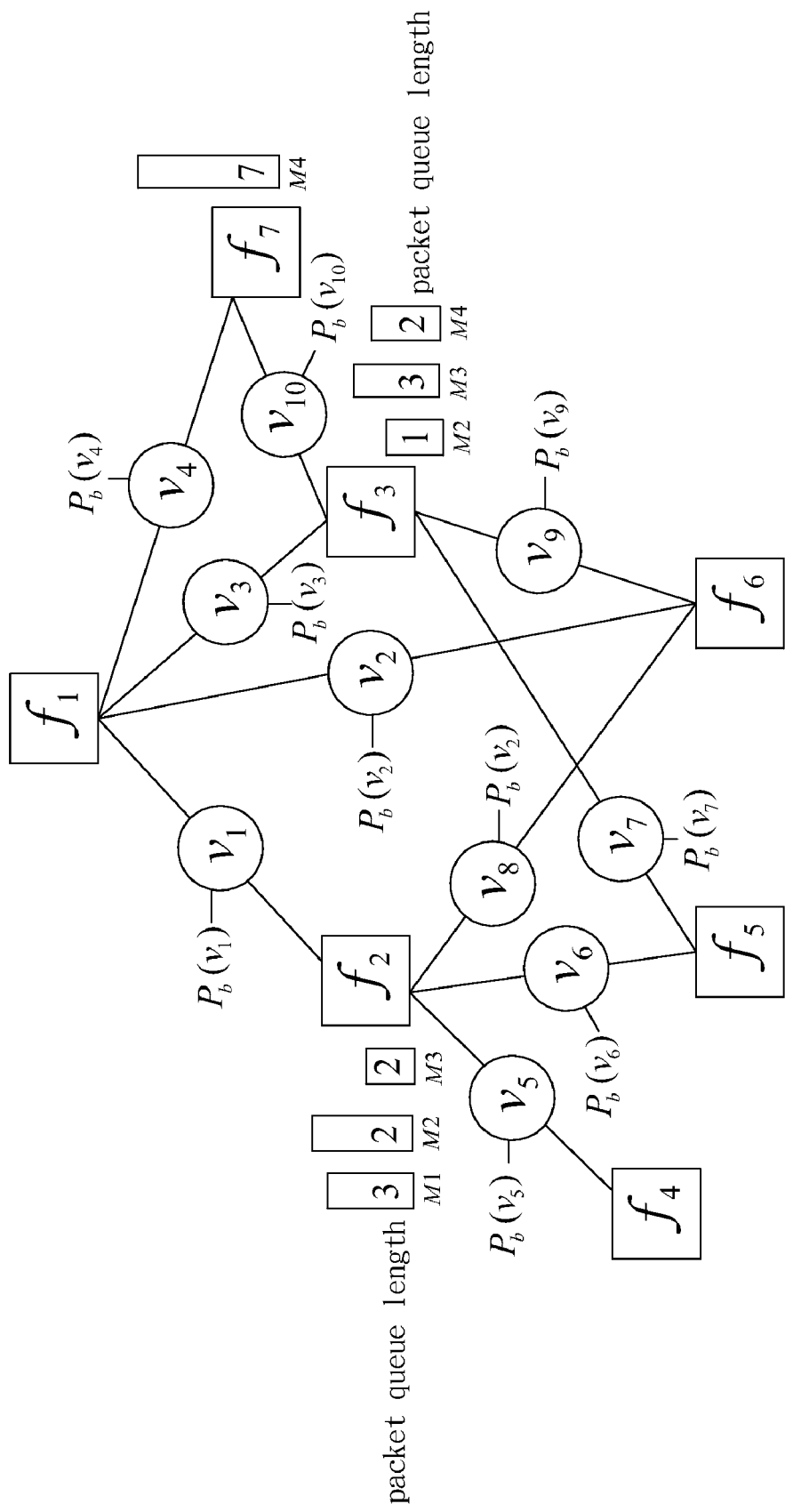
FIG. 4B shows the factor graph of FIG. 3A with information on the packet queue length of each network link, using uplink for communication.

The weighting of the uplinks is the same as the weighting of the downlinks, except that the transmission direction is reverse, and the packet destination is BS. FIG. 4B is the factor graph of FIG. 3A with information on the packet queue length of each network link, using uplink for communication. The weight of local transmission pattern $\{v_1, v_2, v_3, v_4\}$ of BS (agent node $f_1$) is computed as follows:

$$\omega_t(f_1, \{1, 0, 0, 0\}) = 7/8 + 7/6 + 7/7 = 3.0;$$
$$\omega_t(f_1, \{0, 1, 0, 0\}) = 8/7 + 8/6 + 8/7 = 3.6;$$
$$\omega_t(f_1, \{0, 0, 1, 0\}) = 6/7 + 6/8 + 6/7 = 2.5;$$
$$\omega_t(f_1, \{0, 0, 0, 1\}) = 7/7 + 7/8 + 7/6 = 3.0.$$

The weight of non-zero local transmission pattern $\{v_1, v_5, v_6, v_8\}$ of agent node $f_2$ is computed as follows: $\omega_t(f_2, \{1,0,0,0\})=1$; $\omega_t(f_2, \{0,1,0,0\})=(9-7)/\epsilon+(9-7)/(8-7)=2(\epsilon+1)$; $\omega_t(f_2, \{0,0,1,0\})=0/(9-7)=0$; and $\omega_t(f_2, \{0,0,0,1\})=(8-7)/(9-7)+(8-7)/\epsilon=\epsilon+0.5$.

The weight of non-zero local transmission pattern $\{v_2, v_8, v_9\}$ of agent node $f_2$ is computed as follows: $\omega_t(f_6, \{1,0,0\})=\omega_t(f_6, \{1,0,0\})=\omega_t(f_6, \{1,0,0\})=1$.

As shown in the above description, the present invention does not need to estimate the SNR. It is only necessary for the neighboring wireless APs to reach a consensus. The weighting scheme of the present invention is natural-competition-based. When the packet queue length of the transmitting end is longer than the packet queue length of the receiving end, the corresponding network link is more likely to be activated for use because the weight of transmission pattern activating the network link is increased. This characteristic allows the urgent packets having a higher priority, and prevents the packet queue from overflowing on any network node. On the other hand, when the packet queue length of the receiving end is longer than the packet queue length of the transmitting end, the corresponding network link is more likely to be deactivated because the weight of transmission pattern activating the network link is set to 0. Stopping the network link prevents the packet queue from overflowing on any network node, and gives more time for the relay to consume the packets.

It is worth noticing that weighting scheme of the present invention is also applicable to a multi-cell multihop wireless network.

Figure 5:
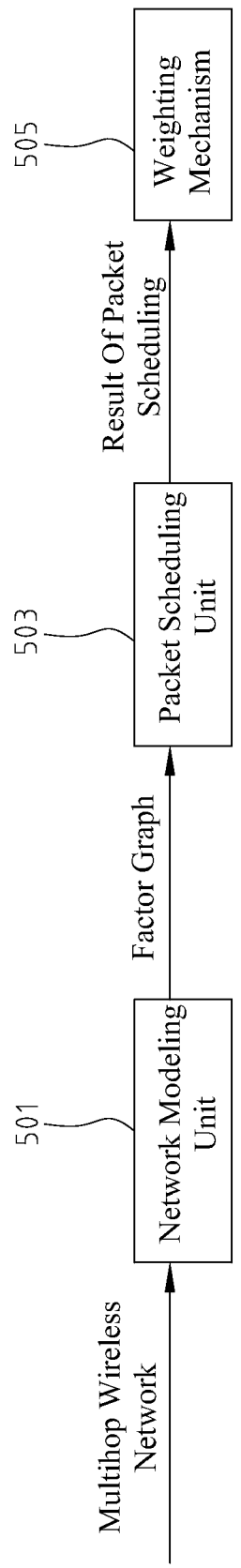
FIG. 5 shows a schematic view of an apparatus realizing FIG. 3.

In accordance with the above fully-distributed packet scheduling method for a wireless network, FIG. 5 shows a block diagram of the apparatus realizing the fully-distributed packet scheduling method. As shown in FIG. 5, the apparatus includes a network modeling unit 501, a packet scheduling unit 503 and a weighting mechanism 505. Network modeling unit 501 is to model a multi-hop wireless network with a factor graph. As aforementioned, the factor graph includes a plurality of agent nodes, a plurality of variable nodes and a plurality of edges. The factor graph is bounded by a group of mutually-interactive constrain rules. Based on the factor graph, packet scheduling unit 503 transforms the packet scheduling problem into a decoding problem of LDPC code, and uses a standard process to solve the decoding problem. Weighting mechanism 505 weights the packet schedule solved by the decoding problem according to the network condition at the time.

The correspondence between the factor graph and the wireless network is described earlier in the construction of factor graph, and therefore, is omitted here.

The present invention is also compared with two conventional packet scheduling techniques, namely, round-robin (RR) and individual-polling (IP). RR and IP are both central-unit-processing-based packet scheduling methods. In RR, all the links of the network are activated in turn with a predetermined order, while the local link between BS and relay is activated in an order that is determined individually in IP.

Figure 6:
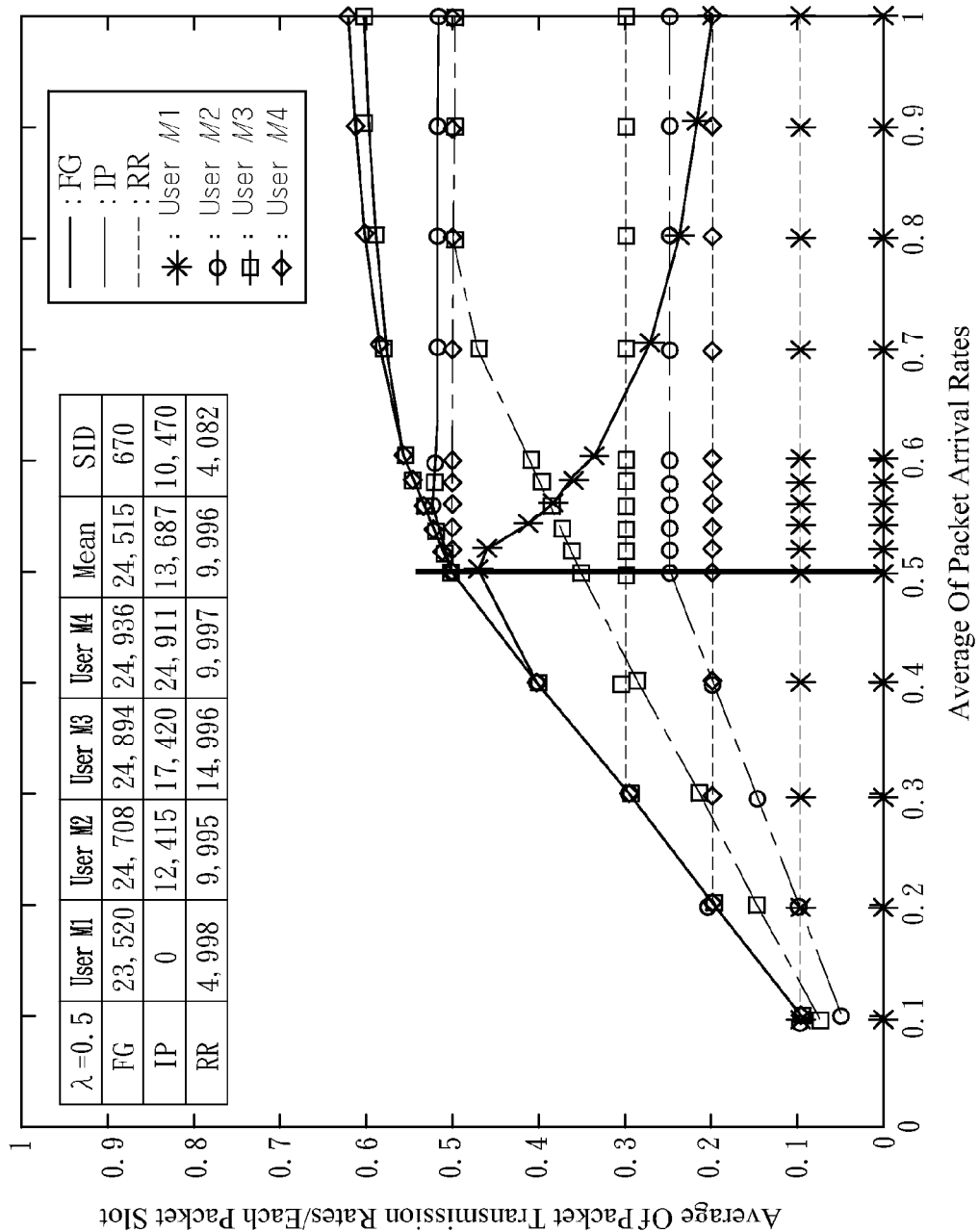
FIG. 6 shows the comparison between the present and the RR and IP in terms of average transmission rate in each packet slot with uplinks for communication in a single cell multihop wireless network.

FIG. 6 shows the comparison between the present and the RR and IP in terms of average transmission rate in each packet slot, and the uplinks are used for communication in a single cell multihop wireless network. The x-axis is the mean of packet arrival rates λ, and the y-axis is the average of transmission rates in each packet slot.

As shown in FIG. 6, when the traffic load in the network is less than the capacity of the system (i.e., λ≦0.5), the weighting scheme of the present invention helps to maintain the fairness of packet transmission rate among all the mobile stations, regardless of the network resources used by each mobile station. Because of the fairness of transmission pattern, the priority of the urgent packets is raised. The fairness of packet scheduling can be seen in the standard deviation (STD) at upper left corner of the table.

When the traffic load in the network is gradually greater than the capacity of the system (i.e., λ≧0.5), the present invention releases the network resource of M1 to help other mobile stations to survive under the heavier traffic load.

Therefore, the average transmission rate in each packet slot and the difference among the users are far better than the two conventional packet scheduling methods.

Figure 7:
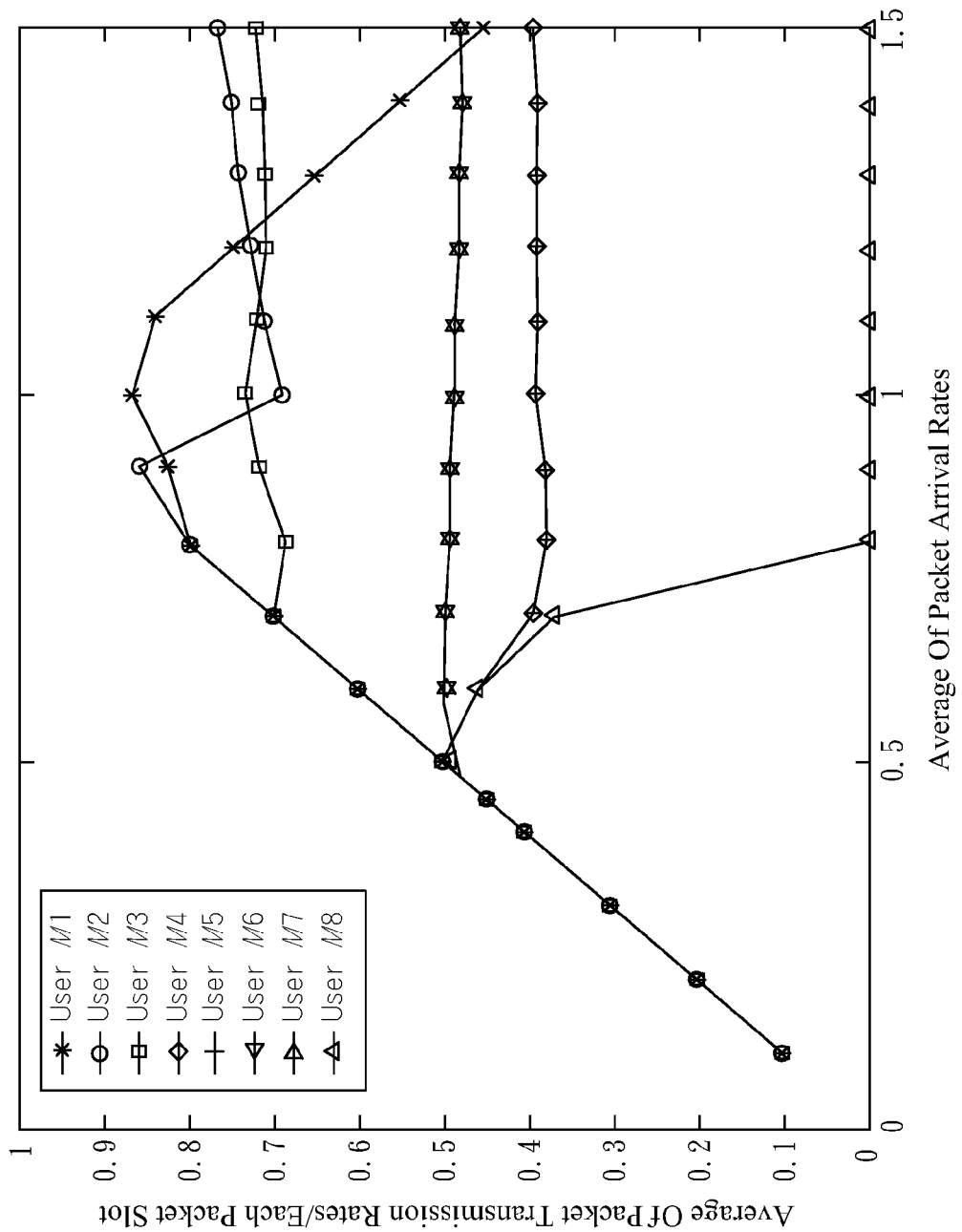
FIG. 7 shows the average transmission rates of mobile stations in each packet slot with uplinks for communication in a multicell multihop wireless network.

FIG. 7 shows the average transmission rates of M1-M8 in each packet slot with uplinks for communication in a multi-cell multi-hop wireless network. The x-axis is the mean of packet arrival rates λ, and the y-axis is the average of transmission rates in each packet slot. Similarly, the weighting scheme helps to maintain the fairness of packet transmission rate among all the mobile stations, as well as helps other mobile stations to survive under the heavier traffic load.

As shown in FIG. 7, the network resources available to each user is not only related to the number of links available, but also related to the traffic consumption service surrounding the user. Although in a multi-cell multihop wireless network, the traffic information among neighboring nodes is complicated, the fully-distributed packet scheduling of the present invention is natural-competition-based. Therefore, regardless of the average packet arrival rate λ, the natural-competition-based method provides the optimal balanced solution.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method of flail-distributed packet scheduling for a network packet scheduling unit of a wireless network, comprising the steps of:
constructing a factor graph using a network modeling unit to model network nodes and network links of a multi-hop wireless network, said factor graph including a plurality of agent nodes, a plurality of variable nodes and a plurality of edges, said factor graph being a graph of a group of mutually-interactive constrain rules;
transforming said packet scheduling into a decoding problem for a low-density parity-check (LDPC) code based on said factor graph, and solving said decoding problem through a standard process in said network packet scheduling unit; and
applying a weighting scheme on a packet schedule obtained from solving said decoding problem according to network condition;
wherein said network packet scheduling unit collects information on packet queue lengths of neighboring agent nodes for each agent node, and computing a weight for each agent node in a local transmission pattern of each local link of each agent node, said weight of an agent node i in the local transmission pattern of a k-th local link of said agent node i is computed as follows:

$$\omega t(f_i\{0, \ldots, 0, 1, 0, \ldots, 0\}) =$$
$$\text{sum of}\{\max(x_{T,t}(k) - x_{R,t}(k), 0) / \max(x_{T,t}(h) - x_{R,t}(h), \varepsilon)\}$$

wherein $f_i$ is a constrain function corresponding to said agent node i, max( ) represents a maximum function, $\varepsilon$ is a positive number, $x_{T,t}(k) - x_{R,t}(k)$ represents total number of packets that reach a destination queue through the k-th local link of said agent node i, $x_{T,t}(h) - x_{R,t}(h)$ represents total number of packets that reach the destination queue through an h-th local link of said agent node i, h is not equal to k, subscripts T and R represent a transmitting end and a receiving end of a local link, and t is a concerned packet slot index.

2. The method as claimed in claim 1, wherein said wireless network is a multihop wireless network.

3. The method as claimed in claim 1, wherein said step of constructing said factor graph further includes the steps of:
replacing each network node by an agent node marked with a corresponding constrain function which defines an interference-avoiding local constrain rule;
replacing each network link by a variable node marked with a corresponding variable; and
linking each variable node to two agent nodes, wherein the network nodes corresponding to said two agent nodes are able to communicate through the network link corresponding to the variable node linked to said two agent nodes.

4. The method as claimed in claim 1, wherein said wireless network is a relay network.

5. The method as claimed in claim 1, wherein said network nodes obey an interference-avoiding local constrain rule in each packet slot.

6. The method as claimed in claim 5, wherein said interference-avoiding local constrain rule includes the following constrain rules:
a network node only transmits to one network node during transmission;
a relay does not transmit and receive packets simultaneously; and
a network node does not receive packets from multiple sources simultaneously.

7. The method as claimed in claim 1, wherein said packet scheduling further includes computation and transportation of soft-information of each variable node to improve network resource utilization, and said soft-information indicates probability of a network link being activated in each packet slot.

8. The method as claimed in claim 7, wherein said standard process computes said soft-information of said variable node through a sum-product algorithm.

9. The method as claimed in claim 1, wherein said network condition depends on urgency of each packet and transmission rate of each network link.

10. The method as claimed in claim 1, wherein said network condition depends on packet queue length and transmission rate of each network link.

11. An apparatus of full-distributed packet scheduling for a wireless network, comprising:
 a network modeling unit, for modeling network nodes and network links of a multi-hop wireless network through a factor graph, said factor graph including a plurality of agent nodes, a plurality of variable nodes and a plurality of edges, said factor graph being a graph of a group of mutually-interactive constrain rules;
 a packet scheduling unit, for transforming said packet scheduling into a decoding problem for a low-density parity-check (LDPC) code based on said factor graph, and solving said decoding problem through a standard process; and
 a weighting mechanism applied on a packet schedule obtained from solving said decoding problem according to network condition;
 wherein said packet scheduling unit collects information on packet queue lengths of neighboring agent nodes for each agent node, and computing a weight for each agent node in a local transmission pattern of each local link of each agent node, said weight of an agent node i in the local transmission pattern of a k-th local link of said agent node i is computed as follows:

$$\omega t(f_i, \{0, \ldots, 0, 1, 0, \ldots, 0\}) = \text{sum of } \{\max(x_{T,t}(k) - x_{R,t}(k), 0) / \max(x_{T,t}(h) - x_{R,t}(h), \varepsilon)\}$$

wherein $f_i$ is a constrain function corresponding to said agent node i, max( ) represents a maximum function, $\varepsilon$ is a positive number, $x_{T,t}(k) - x_{R,t}(k)$ represents total number of packets that reach a destination queue through the k-th local ink of said agent node i, $x_{T,t}(h) - x_{R,t}(h)$ represents total number of packets that reach the destination queue through an h-th local ink of said agent node i, h is not equal to k, subscripts T and R represent a transmitting end and a receiving end of a local link, and t is a concerned packet slot index.

12. The apparatus as claimed in claim 11, wherein said wireless network is a multihop wireless network.

13. The apparatus as claimed in claim 11, wherein said wireless network is a relay network.

14. The apparatus as claimed in claim 11, wherein said network condition depends on urgency of each packet and transmission rate of each network link.

15. The apparatus as claimed in claim 11, wherein said network condition at depends on packet queue length and transmission rate of each network link.

16. The apparatus as claimed in claim 11, wherein correspondence between said factor graph and said wireless network comprises:
 each network node being represented by an agent node marked with a corresponding constrain function which defines an interference-avoiding local constrain rule; and
 each network link being represented by a variable node marked with a corresponding variable;
 wherein each variable node is linked to two agent nodes, and the network nodes corresponding to said two agent nodes are able to communicate through the network link corresponding to the variable node linked to said two agent nodes.

* * * * *